(12) United States Patent
Sato

(10) Patent No.: US 11,412,097 B2
(45) Date of Patent: Aug. 9, 2022

(54) IMAGE PROCESSING APPARATUS THAT DISPLAYS MANY APPS IN SELECTABLE MANNER, CONTROL METHOD THEREFOR, AND STORAGE MEDIUM

(71) Applicant: CANON KABUSHIKI KAISHA, Tokyo (JP)

(72) Inventor: Tomoya Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/245,586

(22) Filed: Apr. 30, 2021

(65) Prior Publication Data
US 2021/0360115 A1 Nov. 18, 2021

(30) Foreign Application Priority Data

May 14, 2020 (JP) .............................. JP2020-085058
May 14, 2020 (JP) .............................. JP2020-085307

(51) Int. Cl.
*H04N 1/00* (2006.01)
(52) U.S. Cl.
CPC ..... *H04N 1/00506* (2013.01); *H04N 1/00392* (2013.01); *H04N 1/00689* (2013.01); *H04N 2201/0094* (2013.01)
(58) Field of Classification Search
CPC combination set(s) only.
See application file for complete search history.

(56) References Cited

U.S. PATENT DOCUMENTS

| 2014/0368875 | A1* | 12/2014 | Sato | H04N 1/00474 |
| | | | | 358/1.15 |
| 2015/0109630 | A1* | 4/2015 | Hiramoto | H04N 1/00482 |
| | | | | 358/1.13 |
| 2016/0370972 | A1* | 12/2016 | Bouknight, Jr | G06F 3/04817 |

FOREIGN PATENT DOCUMENTS

JP 2016117158 A 6/2016

* cited by examiner

*Primary Examiner* — Helen Zong
(74) *Attorney, Agent, or Firm* — Rossi, Kimms & McDowell LLP

(57) ABSTRACT

An image processing apparatus capable of lowering the possibility that app buttons on an app selection screen will be rearranged in a way that is not intended by a user. The image forming apparatus 100 displays a plurality of app buttons for executing respective apps on a plurality of pages of an app selection screen 400 in a dividing manner, and has a structure that switches between the pages of the app selection screen 400 in response to a page switching operation by a user, and changes a display order of the app buttons when a button prioritizing event that is a condition for preferentially displaying at least one of the app buttons is detected. When the button prioritizing event is detected after the page switching operation is performed, the app buttons is not rearranged and the app selection screen is kept unchanged.

20 Claims, 10 Drawing Sheets

FIG. 3

| APP BUTTON ID | APP BUTTON NAME | DEFAULT DISPLAY ORDER | BUTTON PRIORITIZATION EVENT |
|---|---|---|---|
| 0001 | COPY | 1 | DETECT ORIGINAL |
| 0002 | PRINT RECEIVED DOCUMENT | 2 | |
| 0003 | PRINT | 3 | DETECT UNPRINTED JOB |
| 0004 | PRINT ALL | 4 | DETECT UNPRINTED JOB |
| 0005 | SCAN AND SEND | 5 | DETECT ORIGINAL |
| 0006 | USE SAVED FILE | 6 | |
| 0007 | SETTING/REGISTRATION | 7 | |
| 0008 | PAPER SAVE COPY | 8 | DETECT ORIGINAL |
| 0009 | SEND TO SELF | 9 | DETECT ORIGINAL |

IMAGE PROCESSING APPARATUS THAT DISPLAYS MANY APPS IN SELECTABLE MANNER, CONTROL METHOD THEREFOR, AND STORAGE MEDIUM

BACKGROUND OF THE INVENTION

Field of the Invention

The present invention relates to an image processing apparatus, a control method therefor, and a storage medium, and in particular to an image processing apparatus which is capable of displaying a number of installed apps on an app selection screen in a selectable manner, and a control method therefor, as well as a storage medium.

Description of the Related Art

In recent years, many applications (hereafter referred to as "apps") have been installed in an image information apparatus such as a multifunction apparatus. Examples of the apps here include a copying app, a faxing app, and an app for printing print data from a PC.

With an increase in the number of apps installed in the image processing apparatus, the number of app buttons on an app selection screen displayed on an operating unit of the image processing apparatus has been continuing to increase, and there are cases where all app buttons cannot be displayed on one screen because of too many app buttons. In such cases, a plurality of screens (a plurality of pages) is provided as app selection screens so that a desired app button can be selected by switching between pages through operations such as flicking.

On the other hand, an increase in the number of app buttons also leads to an increase in the time required for a user to find an app which he or she wants to operate. Accordingly, there has been proposed a technique in which app buttons displayed on the app selection screen are rearranged according to a status of the image processing apparatus (see, for example, Japanese Laid-Open Patent Publication (Kokai) No. 2016-117158).

For example, when an original of a specific sheet size is placed on a scanner of the image processing apparatus, the app buttons displayed on the app selection screen are rearranged such that app buttons relating to the original are placed in the top. Also, when a print job is submitted from an external apparatus connected to the image processing apparatus via a network, the app buttons displayed on the app selection screen are rearranged such that app buttons relating to the print job are placed in the top. This enables the user to quickly find a desired app button on the app selection screen.

However, if rearrangement of app buttons according to a status of the image processing apparatus as with the technique described in Japanese Laid-Open Patent Publication (Kokai) No. 2016-117158 is rearrangement that is not intended by the user, the user will become confused.

For example, assume that the user has switched between pages through operations such as flicking on the app selection screen and has found a desired app button to be operated. After that, if the user places an original of a specific sheet size on the scanner of the image processing apparatus before depressing the desired app button, this causes rearrangement of app buttons. As a result, the desired app button the user tried to operate moves to another page of the app selections screen, and the user needs to search for the desired app button again. The technique described in Japanese Laid-Open Patent Publication (Kokai) No. 2016-117158 does not take this problem into consideration.

SUMMARY OF THE INVENTION

The present invention provides an image processing apparatus which is capable of reducing the possibility that app buttons on an app selection screen will be rearranged in a way that is not intended by a user, and a control method therefor, as well as a storage medium.

Accordingly, the present invention provides an image forming apparatus with a plurality of functions, comprising at least one processor and at least a memory coupled to the at least one processor and having instructions stored thereon, and when executed by the at least one processor, acting as a screen control unit configured to display function buttons for executing the respective functions on a plurality of pages of a function selection screen in a dividing manner, and switch between the pages of the function selection screen in response to a page switching operation by a user, a detecting unit configured to detect a button prioritizing event that is a condition for preferentially displaying at least one of the function buttons, and a changing unit configured to change a display order of the function buttons when the detecting unit detects the button prioritizing event, wherein the screen control unit in a case where the button prioritizing event is detected in a state in which the page switching operation has not been performed, rearranges the function buttons on the function selection screen according to the changed display order, and in a case where the button prioritizing event is detected after the page switching operation is performed, does not rearrange the function buttons and keep the function selection screen unchanged.

Further features of the present invention will become apparent from the following description of exemplary embodiments (with reference to the attached drawings).

BRIEF DESCRIPTION OF THE DRAWINGS

FIG. 3 is a view showing an example of an app button information table in FIG. 2.

DESCRIPTION OF THE EMBODIMENTS

The present invention will now be described in detail with reference to the accompanying drawings showing embodiments thereof.

First Embodiment

Figure 1:
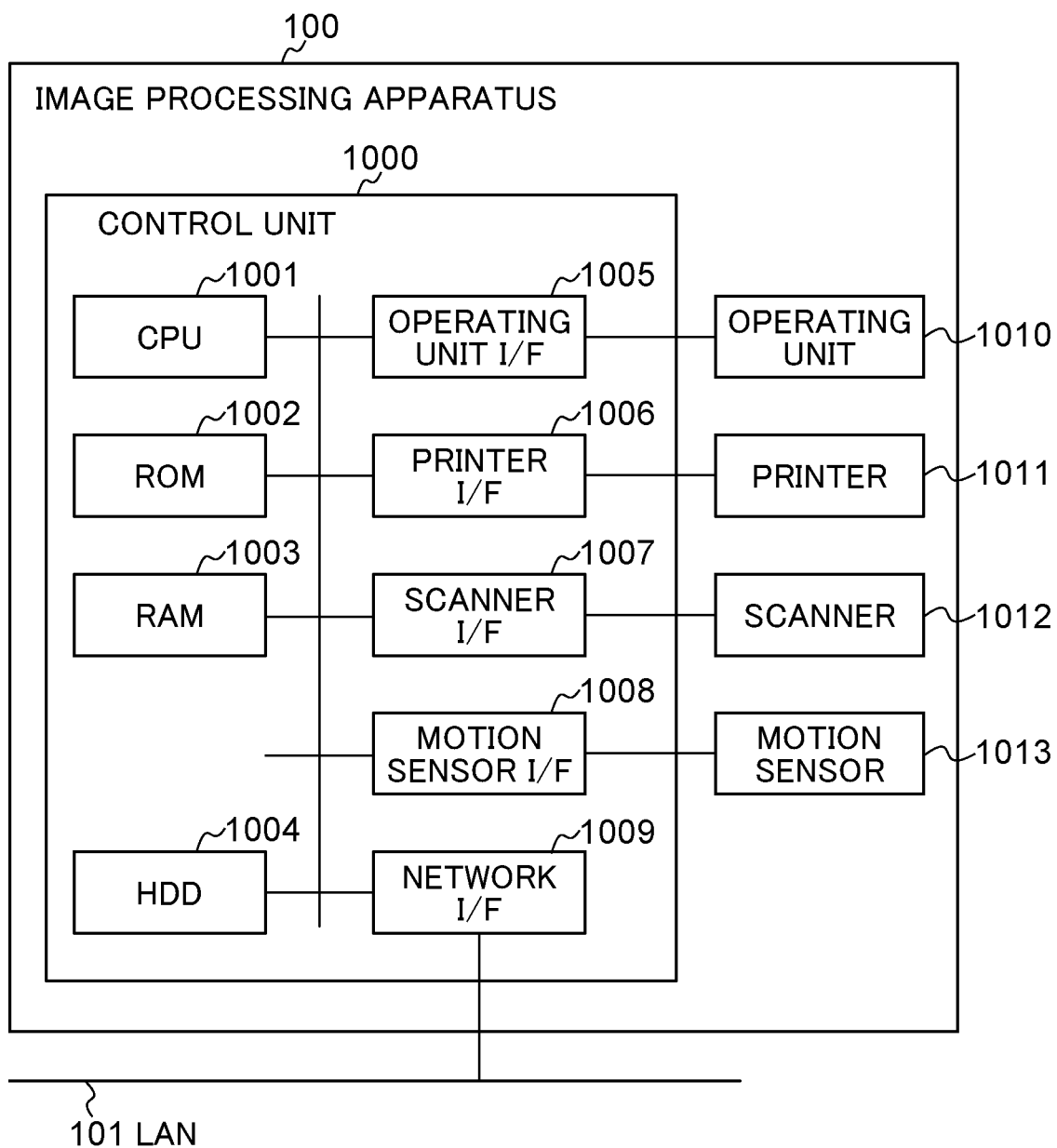
FIG. 1 is a block diagram showing a hardware arrangement of an image processing apparatus according to embodiments of the present invention.

FIG. 1 is a block diagram showing a hardware arrangement of an image processing apparatus 100 according to embodiments of the present invention.

Referring to FIG. 1, the image processing apparatus 100 has a control unit 1000, an operating unit 1010, a printer 1011, a scanner 1012, and a motion sensor 1013 and is connected to a LAN 101.

The control unit 1000 controls the overall operation of the image processing apparatus 100. The control unit 1000 has a CPU 1001, a ROM 1002, a RAM 1003, an HDD 1004, an operating unit I/F 1005, a printer I/F 1006, a scanner I/F 1007, a motion sensor I/F 1008, and a network I/F 1009.

The CPU 1001 reads out control programs stored in the ROM 1002 and performs various types of control such as reading control and transmission control.

The ROM 1002, which is a boot ROM, stores a system boot program. The RAM 1003 is used as a temporary storage area such as a main memory or work area for the CPU 1001.

The HDD 1004 stores image data, various programs, or various information tables.

The operating unit I/F 1005 is an interface for connecting the operating unit 1010 and the control unit 1000 to each other.

The operating unit 1010 is equipped with a liquid crystal display having a touch panel function, a keyboard, and so forth. The operating unit 1010 also includes hard keys for operating the image processing apparatus 100.

The printer I/F 1006 is an interface for connecting the printer 1011 and the control unit 1000 to each other. Image data to be printed by the printer 1011 is transferred from the control unit 1000 to the printer 1011 via the printer I/F 1006 and printed on a recording medium (sheet) by the printer 1011.

The scanner I/F 1007 is an interface for connecting the scanner 1012 and the control unit 1000 to each other. The scanner 1012, which has a feeder or platen, generates image data by reading an image off an original placed on the feeder or platen, and inputs the image data to the control unit 1000 via the scanner I/F 1007.

The motion sensor I/F 1008 is an interface for connecting the motion sensor 1013 and the control unit 1000 to each other. The motion sensor 1013 determines whether or not there is a person in front of the image processing apparatus 100 and inputs a result of the determination to the control unit 1000 via the motion sensor I/F 1008.

The network I/F 1009 is an interface for connecting the control unit 1000 to the LAN 101. The network I/F 1009 sends and receives information to and from external apparatuses connected to a network via the LAN 101.

Typical examples of functions (applications) which the image processing apparatus 100 has include a copying app, a printing app, a scanning and sending app, a scanning and saving app, and a saved file-using app.

The copying app is a function of printing image data, which is generated by the scanner 1012 reading an image off an original, using the printer 1011.

The printing app is a function of printing image data based on a print job, which is submitted from an external apparatus such as an information processing apparatus connected to the network via the network I/F 1009, using the printer 1011.

The scanning and sending app is a function of sending image data, which is generated by the scanner 1012 reading an image off an original, to the external apparatus via the network I/F 1009.

The scanning and saving app is a function of saving image data, which is generated by the scanner 1012 reading an image off an original, on the HDD 1004.

The saved file-using app is a function of printing image data saved on the HDD 1004 using the printer 1011 or sending image data saved on the HDD 1004 to the external apparatus via the network I/F 1009.

Figure 2:
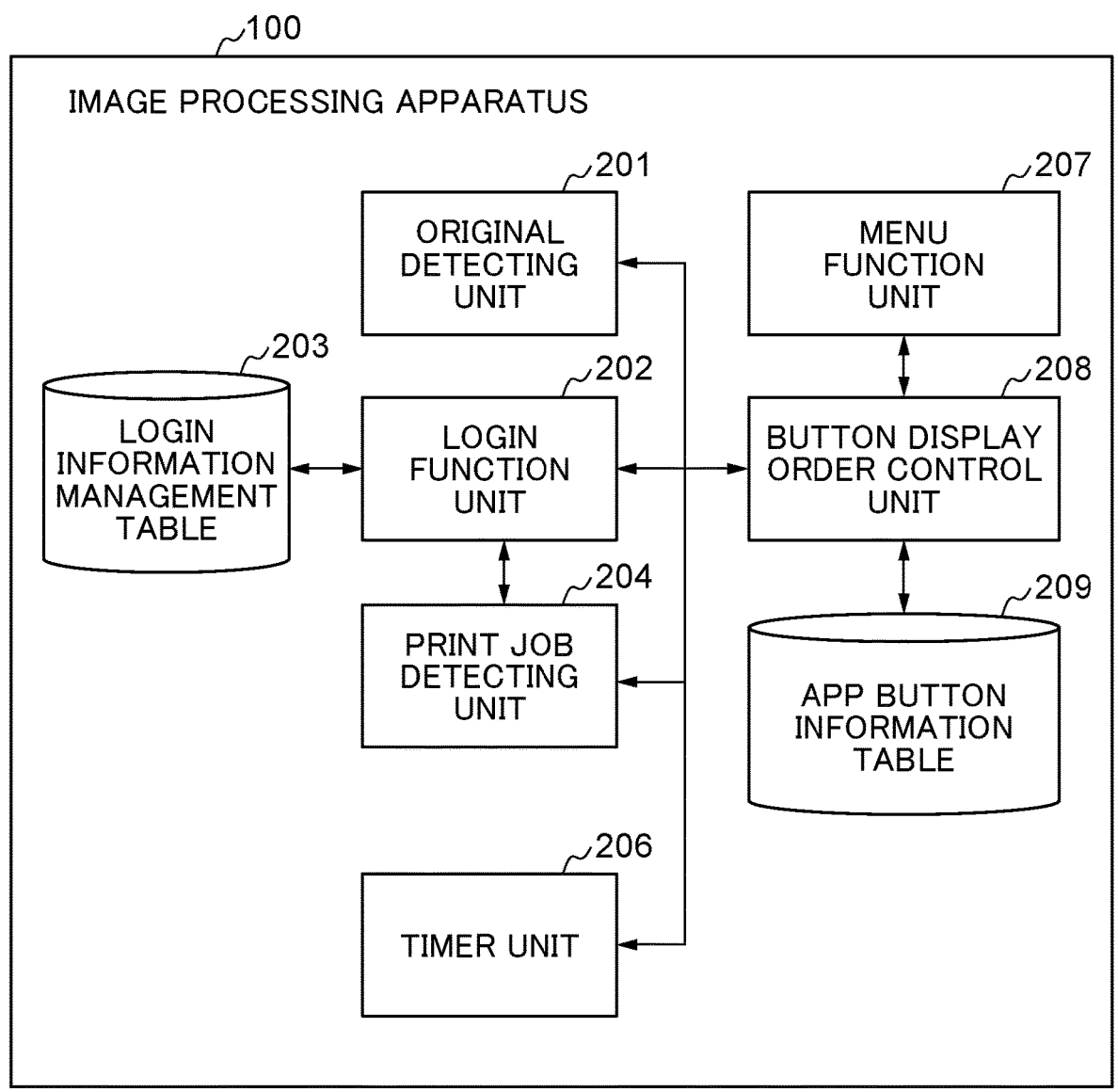
FIG. 2 is a block diagram showing a software arrangement of the image processing apparatus.

FIG. 2 is a block diagram showing a software arrangement of the image processing apparatus 100. Each piece of software is stored in the ROM 1002 and executed by the CPU 1001.

Referring to FIG. 2, the image processing apparatus 100 has an original detecting unit 201, a login function unit 202, a login information management table 203, and a print job detecting unit 204. The image processing apparatus 100 also has a timer unit 206, a menu function unit 207, a button display order control unit 208, and an app button information table 209.

The original detecting unit 201 detects whether or not an original is placed on the scanner 1012 of the image processing apparatus 100 and holds a result of the detection. Examples of a state in which an original is placed on the scanner 1012 include a state in which an original is placed on the feeder, a state in which an original is placed on the platen, and a state in which the platen is opened. It should be noted that the state in which an original is placed on the scanner 1012 is not limited to them.

The login function unit 202 performs an authentication function of the image processing apparatus 100. Specifically, the login function unit 202 manages display languages to be displayed on the operating unit 1010 with respect to each authenticated user, and manages information about whether or not there is a print job that has not yet been subjected to a printing process by the printer 1011 (hereafter referred to as an "unprinted job") with respect to each authenticated user. The login function unit 202 performs the authentication function when the authentication function is enabled (is ON). A setting as to whether to enable (ON) or disable (OFF) the authentication function is made by a user via the operating unit 1010. Information about whether the authentication function is ON or OFF is stored in the HDD 1004, and the login function unit 202 refers to this information. When the authentication function is ON, the user is required to log in so as to operate the image processing apparatus 100. When the authentication function is OFF, the user is not required to log in so as to operate the image processing apparatus 100.

The login information management table 203 holds IDs and passwords of authenticated users as well as information that should be managed with respect to each user. Examples of the information that should be managed with respect to each user include information about display language for users and information about unprinted jobs. It should be noted that the information that should be managed with respect to each user is not limited to them.

The print job detecting unit 204 holds a state whether or not there is an unprinted job submitted to the image processing apparatus 100 from the external apparatus via the LAN 101. When the authentication function is ON, the print job detecting unit 204 works in cooperation with the login function unit 202 to hold a state whether or not there is an unprinted job with respect to each authenticated user.

Figure 4A:
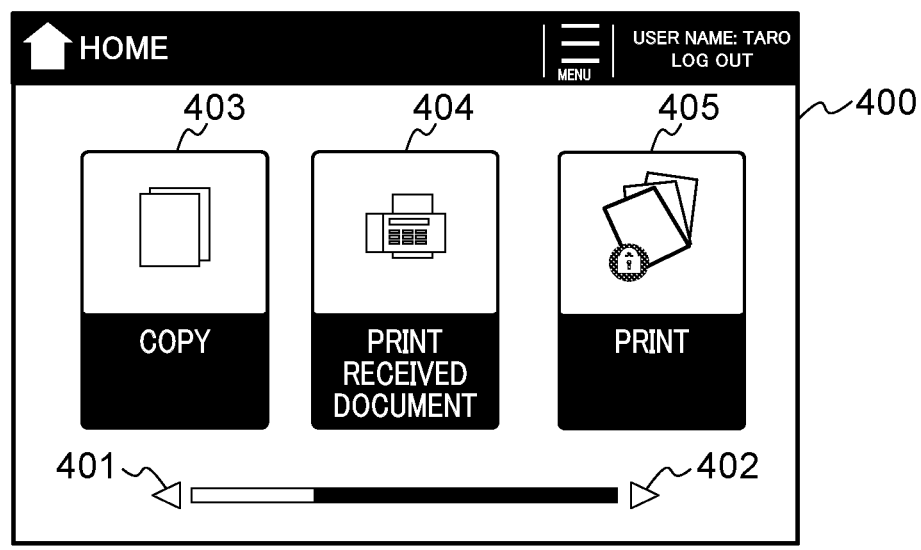
FIGS. 4A to 4C are views showing an app selection screen that is displayed in a case where app buttons are displayed in a default display order.
Figure 4B:
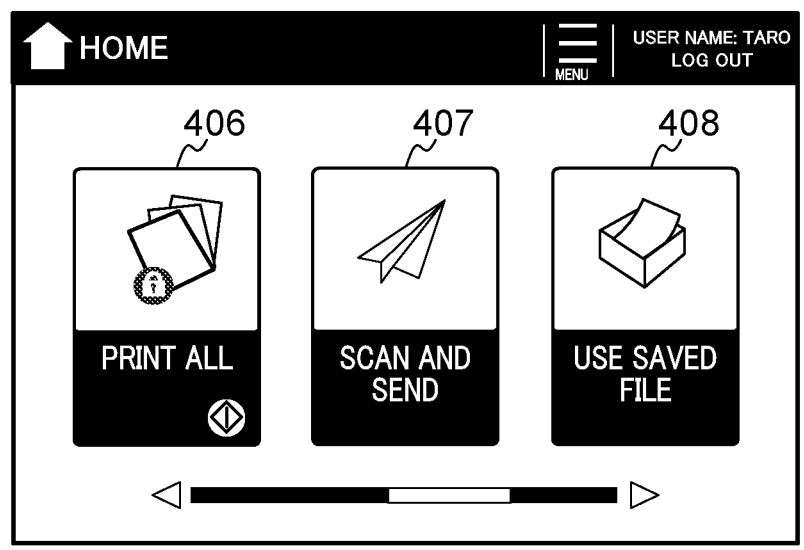
Figure 4C:
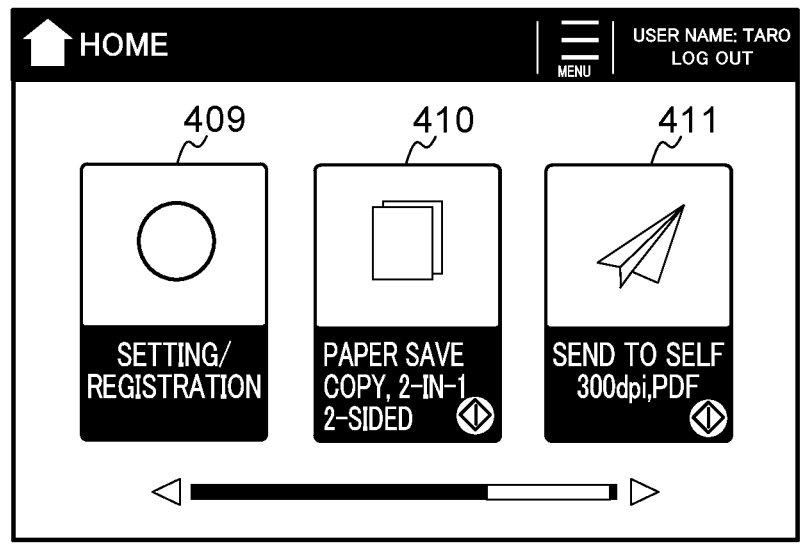

The timer unit 206 measures a time period that has elapsed since the user operated the image processing apparatus 100 last time. When the elapsed time period measured by the timer unit 206 is equal to or greater than a predetermined time period, the operating unit 1010 switches the app selection screen 400 to an app selection screen 400 shown in FIGS. 4A to 4C using an auto clear function. It should be noted that FIGS. 4A to 4C show the app selection screen 400 in a state in which the user has logged in to the image processing apparatus 100, and even when the authentication function is OFF, the same screen switching is performed.

The menu function unit 207 controls screens displayed on the operating unit 1010. The button display order control unit 208 notifies the menu function unit 207 of an order in which app buttons are displayed (hereafter referred to as a "button display order"). The menu function unit 207 displays the app selection screen 400 on which app buttons are arranged in accordance with the notified of button display order. Then, upon detecting a depression of an app button on the displayed app selection screen 400, the menu function unit 207 controls the operating unit 1010 to switch the app selection screen 400 to a screen for executing the corresponding app. As will be described later, when the app selection screen 400 has a plurality of pages, the menu function unit 207 switches between the pages of the app selection screen 400 in response to a page switching operation performed by the user. It should be noted that after switching between the pages of the app selection screen 400 in response to the page switching operation, even when the menu function unit 207 is notified of a button display order by the button display order control unit 208, the menu function unit 207 does not rearrange the app buttons in accordance with this button display order, of which details are described later.

The button display order control unit 208 refers to the app button information table 209, and notifies the menu function unit 207 of a button display order according to states of the original detecting unit 201, the login function unit 202, the print job detecting unit 204, and the timer unit 206. For example, when the original detecting unit 201 detects an original, an operation which the user is to perform next is likely to be an operation involving an original scanning-in process. Accordingly, the button display order control unit 208 notifies the menu function unit 207 of a button display order in which app buttons for reading an original are placed in the top. When the print job detecting unit 204 detects an unprinted job, an operation which the user is to perform next is likely to be printing out the unprinted job. Accordingly, the button display order control unit 208 notifies the menu function unit 207 of a button display order in which app buttons for outputting the unprinted job are placed in the top.

The app button information table 209 manages information about app buttons to be displayed on the app selection screen 400.

FIG. 3 is a view showing an example of the app button information table 209. It should be noted that the app button information table 209 may be stored in the HDD 1004 of the image processing apparatus 100 or may be stored in an external storage device connected to the image processing apparatus 100 via the network I/F 1009. The app button information table 209 may also be managed with respect to each user. In this case, the app button information table 209 is held in association with the login information management table 203 and read out at the time of authentication.

Referring to FIG. 3, the app button information table 209 has four data columns 301 to 304.

The data column 301 manages values of app button IDs for uniquely identifying respective app buttons.

The data column 302 manages names of the app buttons to be displayed on the app selection screen 400.

The data column 303 manages a default display order for the app buttons. In a case before the menu function unit 207 rearranges the app buttons on the app selection screen 400 in accordance with a button display order given by the button display order control unit 208, the app buttons are displayed in the default display order on the app selection screen 400.

The data column 304 manages button prioritizing events, which is a condition for preferentially displaying at least one of the app buttons, for respective app buttons.

For example, a copying app (app button ID 0001) is an app for carrying out a process to read an original using the scanner 1012, and hence a button prioritizing event for this app is "Detect original". Likewise, a button prioritizing event for apps with app button IDs 0005, 0008, and 0009 is "Detect original". A printing app (app button ID 0003) is an app for carrying out a process to print an unprinted job using the printer 1011, and hence a button prioritizing event for this app is "Detect unprinted job". Likewise, the button prioritizing event for an app with an app button ID 0004 is "Detect unprinted job".

It should be noted that information managed in the app button information table 209 is not limited to the one described above. The button prioritizing events managed in the data column 304 are not limited to detection of an original and detection of an unprinted job. For example, there may be an app button for which the prioritizing event is detection of a presence of a fax receiving job, and an app button for which the prioritizing event is detection of occurrence of an event requiring maintenance in the image processing apparatus 100.

Information about the default display order managed in the data column 303 and information about the button prioritizing events managed in the data column 304 may be held in advance in the HDD 1004 or the like or may be set by the user.

Referring to FIGS. 4A to 6C, a description will now be given of a screen switching method for the app selection screen 400 displayed on the operating unit 1010 according to the present embodiment.

FIGS. 4A to 4C are views showing the app selection screen 400 in a case where the app buttons are displayed in the default display order.

By making selecting operation of one of the app buttons displayed on the app selection screen 400, the user can use various applications which the image processing apparatus 100 has.

The number of app buttons displayed in one screen of the app selection screen 400 can be set on a setting screen, not shown, by the user. In an example described here, the number of app buttons displayed on one screen is set to three.

When the menu function unit 207 is to start displaying the app selection screen 400, the button display order control unit 208 notifies the menu function unit 207 of the default display order managed in the data column 303 of the app button information table 209 as a button display order. The menu function unit 207 arranges and displays the app buttons on the app selection screen 400 in accordance with the notified button display order of. When there is a plurality of app buttons to be displayed on the app selection screen 400 and they cannot fit into one screen, the menu function unit 207 displays them on a plurality of pages in a dividing manner. In this case, the menu function unit 207 switches between display pages of the app selection screen 400 in response to page switching operations, more specifically, flick operations on the app selection screen 400 or depressions of page switching buttons 401 and 402.

For example, when there are nine app buttons to be displayed on the app selection screen 400, the app selection screen 400 is displayed on three pages in a dividing manner as shown in FIGS. 4A to 4C. When a flicking operation from the left to the right is performed on this screen or the page switching button 402 is depressed while the first-page screen (FIG. 4A) of the app selection screen 400 is being displayed, the menu function unit 207 switches the app selection screen 400 to the second-page screen (FIG. 4B). Further, when the user performs the page switching operation in a similar manner, the menu function unit 207 switches the display page of the app selection screen 400 to the third-page screen (FIG. 4C). The user searches for a desired app button by thus sequentially switching between the display pages of the app selection screen 400 and causes the image processing apparatus 100 to perform a desired operation by depressing the desired app button. It should be noted that when a flicking operation from the right to the left is performed on the app selection screen 400 or the page switching button 401 is depressed, the display pages of the app selection screen 400 are switched in reverse order to the order described above.

A "Copy" button 403, a "Print received document" button 404, and a "Print" button 405 are displayed on the first-page screen of the app selection screen 400 shown in FIG. 4A.

The "Copy" button 403 is a button for switching the display to a screen for executing the copying app (hereafter referred to as the copying app screen).

The "Print received document" button 404 is a button for switching the display to a screen for executing a received document printing app.

The "Print" button 405 is a button for switching the display to a screen for executing the printing app.

A "Print all" button 406, a "Scan and send" button 407, and a "Use saved file" button 408 are displayed on the second-page screen of the app selection screen 400 shown in FIG. 4B.

The "Print all" button 406 is a button for printing out all unprinted jobs held by the printing app.

The "Scan and send" button 407 is a button for switching the display to a screen for executing the scanning and sending app.

The "Use saved file" button 408 is a button for switching the display to a screen for executing the saved file-using app.

A "Setting/registration" button 409, a "Paper save copy" button 410, and a "Send to self" button 411 are displayed on the third-page screen of the app selection screen 400 shown in FIG. 4C.

The "Setting/registration" button 409 is a button for displaying a screen for making various settings on the image processing apparatus 100.

The "Paper save copy" button 410 is a button for making a copy in 2 in 1 with a two-sided print setting. When the "Paper save copy" button 410 is depressed, without the display being switched to the copying app screen, both sides of an original placed on the platen are read and the read images are printed out in a 2-in-1 layout.

The "Send to self" button 411 is a button for scanning in an original with the scanner 1012 and sending the scanned-in image to a mail address of a user who has logged in the image processing apparatus 100. When the "Send to self" button 411 is depressed, an original is read with a set resolution, and the read image is converted into a set file format and sent, without the display being switched to the screen for the "scanning and sending" app. FIG. 4C shows an example in which a setting is made so that an original is read with a resolution of 300 dpi, converted into a PDF format, and sent.

Figure 5A:
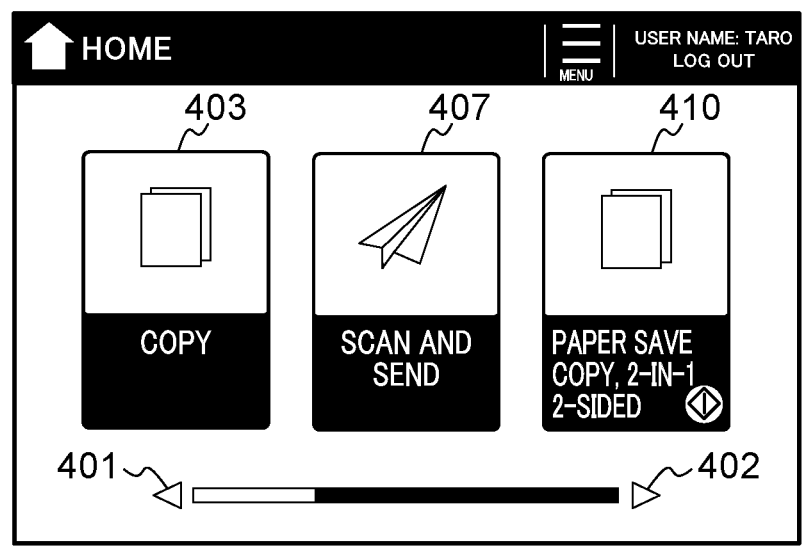
FIGS. 5A to 5C are views showing the app selection screen that is displayed when an original is detected.
Figure 5B:
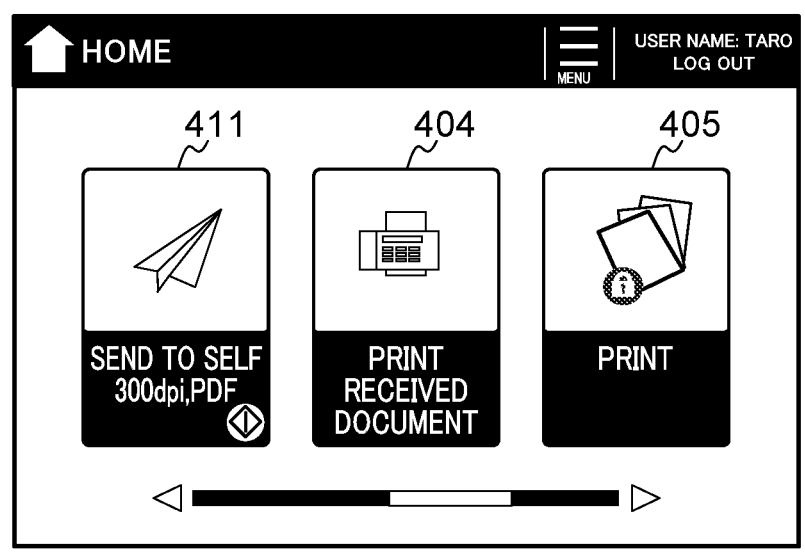
Figure 5C:
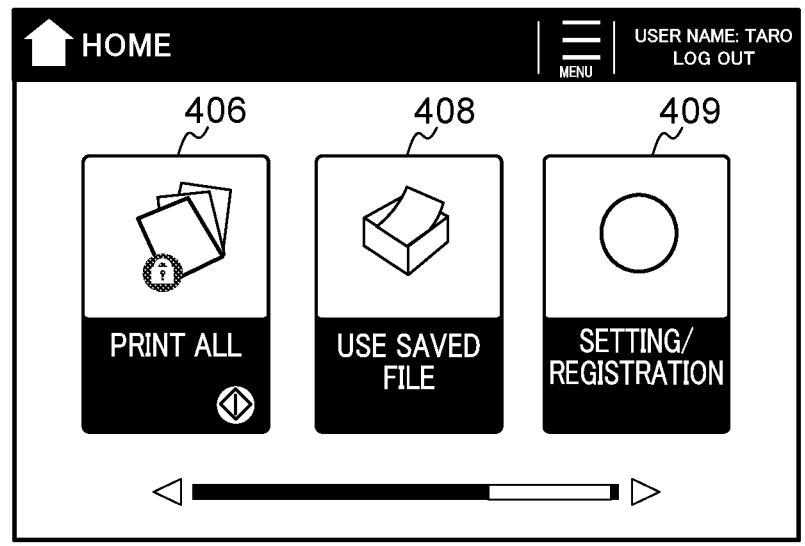

As shown in FIGS. 5A to 5C, when the original detecting unit 201 has detected placement of an original on the scanner 1012, the order in which the app buttons are displayed on the app selection screen 400 changes from the default display order. It should be noted that FIGS. 5A to 5C show the app selection screen 400 that is displayed when the original is detected before switching between pages in response to the page switching operation.

Referring to FIGS. 5A to 5C, the app buttons for which the button prioritizing event indicated in the data column 304 of the app button information table 209 is "Detect original" are rearranged to be placed in the top. Specifically, the "Copy" button 403, the "Scan and send" button 407, the "Paper save copy" button 410, and the "Send to self" button 411 are rearranged to be placed in the top.

Figure 6A:
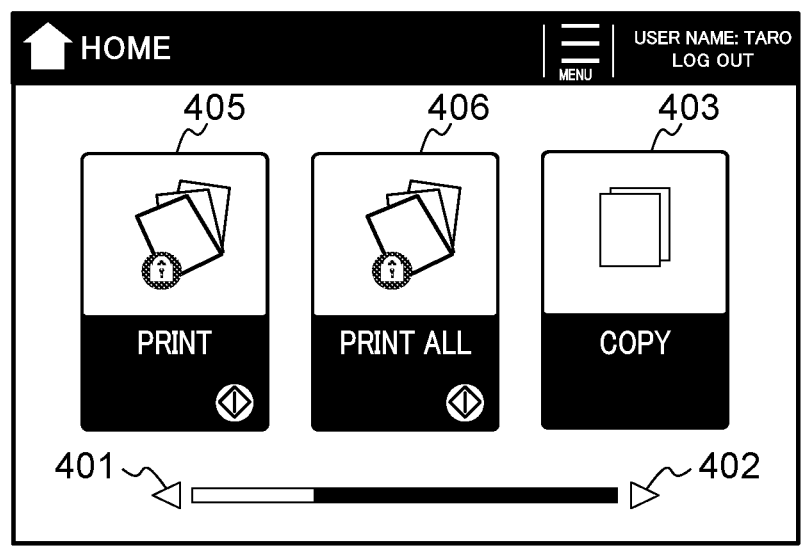
FIGS. 6A to 6C are views showing the app selection screen that is displayed when an unprinted job is detected.
Figure 6B:
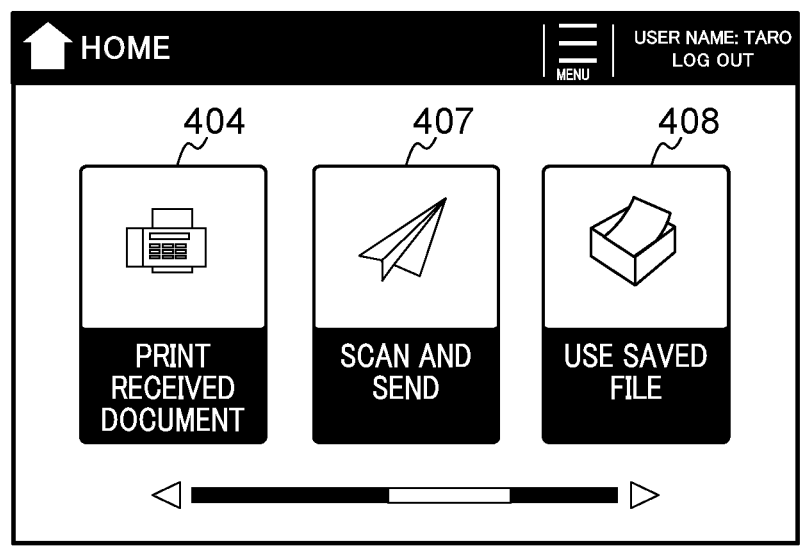
Figure 6C:
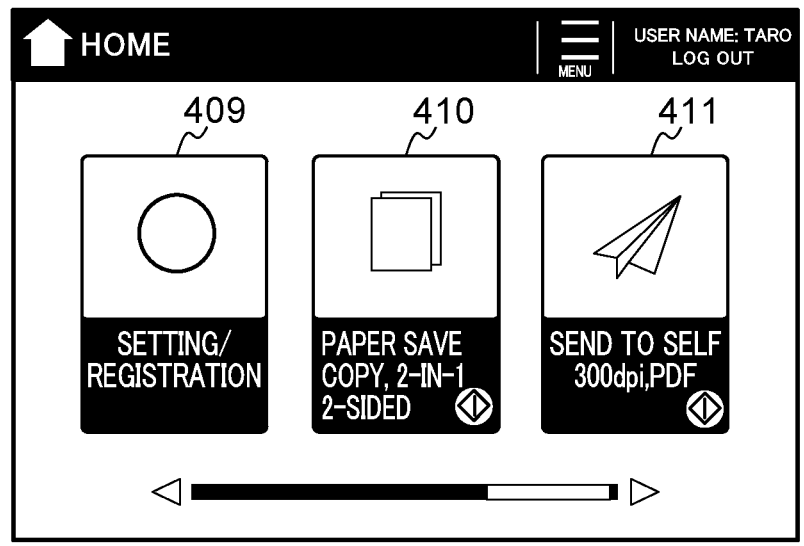

Similarly, as shown in FIGS. 6A to 6C, when the print job detecting unit 204 has detected an unprinted job, the order in which the app buttons are displayed on the app selection screen 400 changes from the default display order. It should be noted that FIGS. 6A to 6C show the app selection screen 400 that is displayed when the unprinted job is detected before switching between pages in response to the page switching operation.

Referring to FIGS. 6A to 6C, the app buttons for which the button prioritizing event indicated in the data column 304 of the app button information table 209 is "Detect unprinted job" are rearranged to be placed in the top. Specifically, the "Print" button 405 and the "Print all" button 406 are rearranged to be placed in the top.

Figure 7:
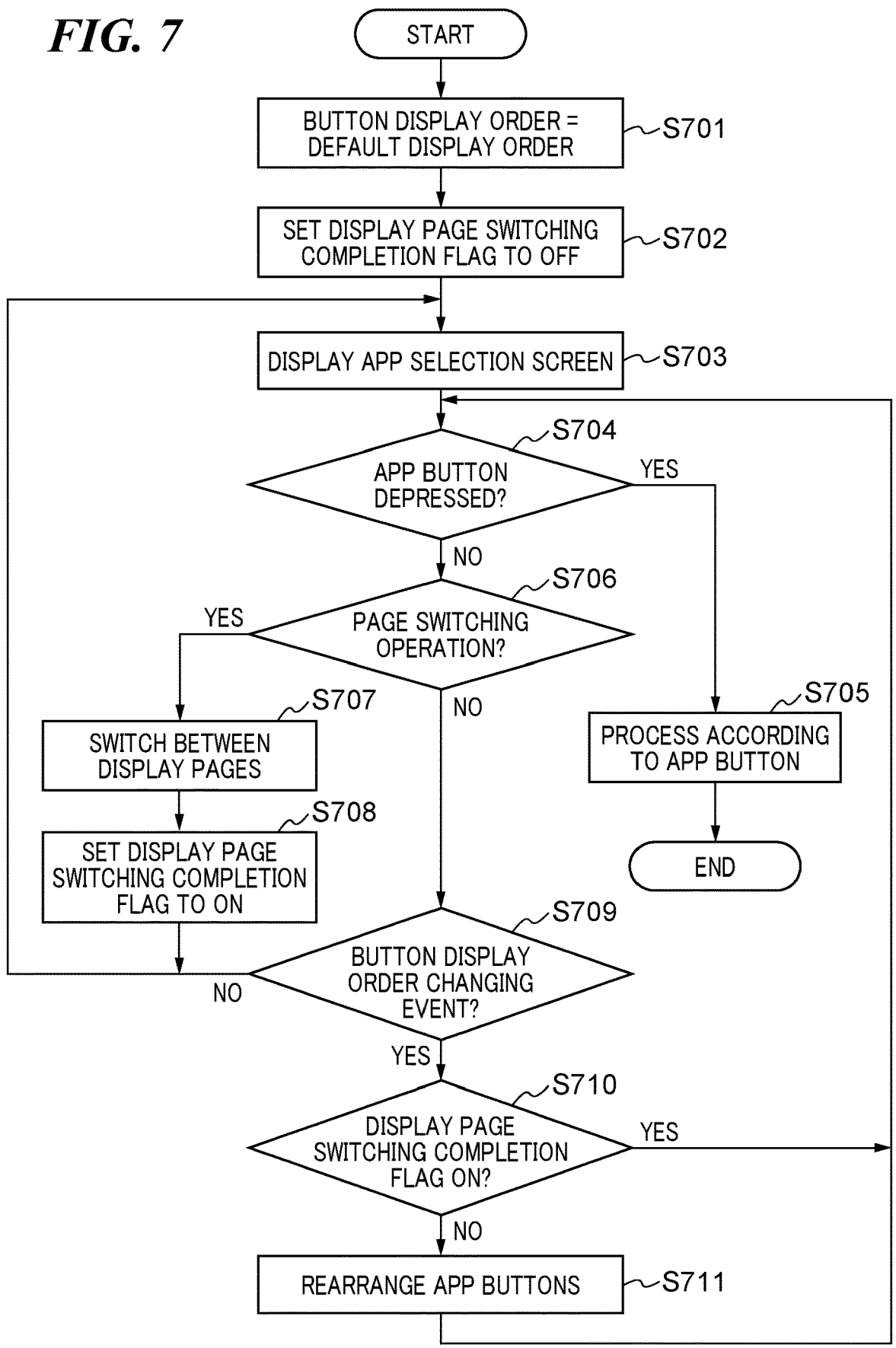
FIG. 7 is a flowchart of a rearrangement process for app buttons displayed on the app selection screen.

FIG. 7 is a flowchart of a rearrangement process for the app buttons displayed on the app selection screen 400. Steps in FIG. 7 are executed by the CPU 1001 of the image processing apparatus 100 reading out a program from the ROM 1002.

In step S701, the CPU 1001 sets the display order of the app buttons to the default display order. Specifically, the button display order control unit 208 refers to the information in the app button information table 209 and notifies the menu function unit 207 of the information about the default display order in the data column 303 as a button display order. The CPU 1001 holds "1", which is a default display page number held in the HDD 1004 in advance, as a display page number in the RAM 1003.

Next, in step S702, the CPU 1001 initializes a display page switching completion flag, which indicates whether or not pages have been switched in response to the page switching operation, to OFF. Specifically, the menu function unit 207 holds a setting value OFF in the RAM 1003 as an initial value of the display page switching completion flag.

Then, in step S703, the CPU 1001 displays the app selection screen 400. Specifically, the menu function unit 207 displays the app buttons on the app selection screen 400 in the button display order which the menu function unit 207 has been notified of by the button display order control unit 208. As a result of the process in the step S701, the app buttons are arranged in the default display order on a screen that is displayed first as the app selection screen 400, and its display page number is 1. Thus, the screen in FIG. 4A is displayed as the app selection screen 400.

After that, in step S704, the CPU 1001 determines whether or not an app button has been depressed by the user. When the CPU 1001 determines that an app button has been depressed, the process proceeds to step S705, and when the CPU 1001 determines that no app button has been depressed, the process proceeds to step S706.

In the step S705, the CPU 1001 carries out a process according to the depressed app button. Specifically, the menu function unit 207 determines which app button has been depressed, and executes an app according to the depressed app button or switches to a screen for executing this app. For example, when the depressed app button is the "Copy" button 403, the menu function unit 207 switches the display to the copying app screen.

In the step S706, the CPU 1001 determines whether or not the page switching operation has been performed. Specifically, the menu function unit 207 receives an operating signal from the operating unit 1010 and determines a user operation. When the determined user operation is a depression of the page switching button 401 or 402 or a flick operation on the app selection screen 400, the user operation is determined that the page switching operation. When the CPU 1001 determines that the page switching operation has been performed, the process proceeds to step S707, and when the CPU 1001 determines that the page switching operation has not been performed, the process proceeds to step S709.

In the step S707, the CPU 1001 switches between the display pages. Specifically, the menu function unit 207 moves the display page to the right or left according to the page switching operation determined in the step S706.

In step S708, the CPU 1001 sets the display page switching completion flag to ON. Specifically, the menu function unit 207 overwrites the display page switching completion flag held in the RAM 1003 with ON. After that, the process returns to the step S703.

In the step S709, the CPU 1001 determines whether or not a button display order changing event has occurred. When the button display order changing event has occurred, the button display order control unit 208 changes the button display order according to the button display order change event and notifies the menu function unit 207 of the changed button display order, followed by the process proceeding to step S710. On the other hand, when the button display order changing event has not occurred, the process proceeds to step S713.

Examples of the button display order changing event include detection of an original and detection of an unprinted job.

Upon detecting placement of an original on the scanner 1012, the original detecting unit 210 provides an original detection notification to the button display order control unit 208. Upon receiving the original detection notification, the button display order control unit 208 refers to the app button information table 209, and notifies the menu function unit 207 of the changed button display order in which the app buttons for which the button prioritizing event is "Detect original" are displayed in the top.

Upon detecting presence of an unprinted job, the print job detecting unit 204 provides an unprinted job notification to the button display order control unit 208. Upon receiving the unprinted job notification, the button display order control unit 208 refers to the app button information table 209, and notifies the menu function unit 207 of the changed button display order in which the app buttons for which the button prioritizing event is "Detect unprinted job" are displayed in the top.

It should be noted that when two or more button prioritizing events have occurred, for example, when the button display order control unit 208 has received both the original detection notification and the unprinted job notification, the button display order control unit 208 changes the button display order with a higher priority being given to the latter. Namely, the button display order control unit 208 changes the button display order based on the notification received at a later time. It should be that in such a case, it may be determined in advance which notification will be used as a basis for the button display order control unit 208 to change the button display order.

In the step S710, the CPU 1001 determines whether or not the display page switching completion flag is ON. Specifically, the menu function unit 207 reads out the display page switching completion flag held in the RAM 1003 and makes the determination. When the menu function unit 207 determines that the display page switching completion flag is ON, the CPU 1001 returns the process to the step S704. Namely, even if the button prioritizing event occurred, and the menu function unit 207 was notified of the changed button display order by the button display order control unit 208 in the step S709, the menu function unit 207 keeps on displaying the current app selection screen. On the other hand, when the menu function unit 207 determines in the step S710 that the display page switching completion flag is OFF, the CPU 1001 proceeds the process to step S711.

In the step S711, the CPU 1001 rearranges the app buttons displayed on the app selection screen 400. Specifically, the menu function unit 207 rearranges the app buttons displayed on the app selection screen 400 according to the button display order which the menu function unit 207 has been notified of by the button display order control unit 208. After that, the process returns to the step S704.

According to the process described above, the order of the app buttons on the app selection screen 400 is changed in the case where the button display order changing event occurs before the page switching operation on the app selection screen 400 is performed. For example, when detection of an original that is the button display order changing event occurs, the app buttons corresponding to the apps that carry out a process to read the original are preferentially displayed on the app selection screen 400. When detection of an unprinted job as the button display order changing event occurs, the app button corresponding to the apps that performs a print based on the unprinted job is preferentially displayed on the app selection screen 400. On the other hand, the display order of the app buttons on the app selection screen 400 is not changed in the case where the button display order changing event occurs after the page switching operation on the app selection screen 400 is performed.

A description will now be given of a case where the user wants to depress the "Paper Save Copy" button.

In a case where the user places an original on the platen when the process in FIG. 7 has started and the screen in FIG. 4A has been displayed as the app selection screen 400 (the first case), the screen in FIG. 5A on which the "Paper save copy" button 410 is present is displayed as the app selection screen 400 in the step S711. As a result, the user can immediately depress the "Paper save copy" button 410.

On the other hand, there is a case where, after the process in FIG. 7 started, the user finds the "Paper save copy" button 410 by switching the app selection screen 400 from the screen in FIG. 4A to the screen in FIG. 4C through the page switching operation, and then places an original on the platen (the second case). In this case, if the process proceeds to the step S711 in the same way as in the first case described above, the screen in FIG. 5C on which the "Paper save copy" button 410 is not present is displayed as the app selection screen 400. Thus, the user needs to perform the page switching operation again so as to find the "Paper save copy" button 410.

Accordingly, in the present embodiment, in the second case, the process does not proceed to the step S711, and the screen in FIG. 4C remains displayed.

Thus, in both the first case and the second case, the user can quickly select a desired app button displayed on the app selection screen 400 without becoming confused.

Second Embodiment

A description will now be given of a method for, when buttons have been rearranged, resetting the order of buttons to the one used before the rearrangement of the buttons.

Figure 8A:
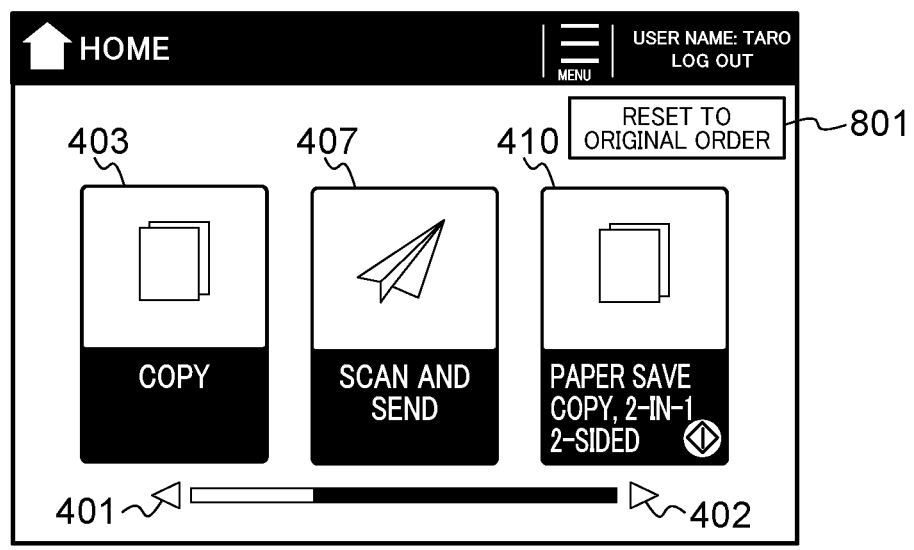
FIGS. 8A to 8C are views showing the app selection screen that is displayed when an original is detected.
Figure 8B:
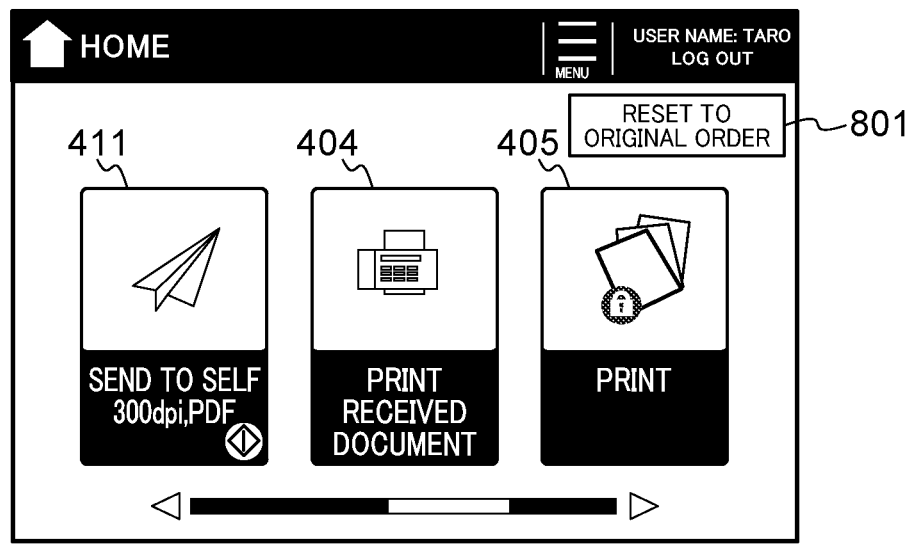
Figure 8C:
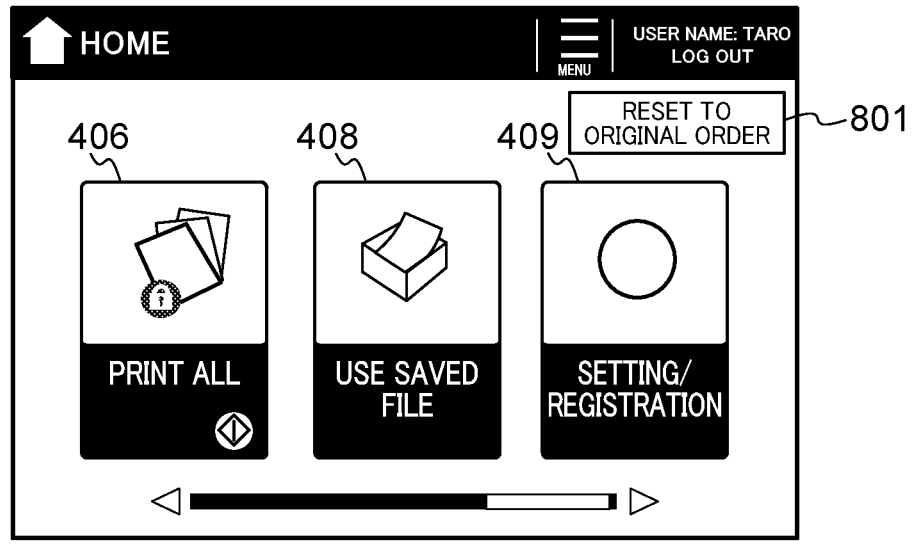

Referring to FIGS. 8A to 8C, the app buttons for which the button prioritizing event indicated in the data column 304 of the app button information table 209 is "Detect original" are rearranged to be placed in the top. Specifically, the "Copy" button 403, the "Scan and send" button 407, the "Paper save copy" button 410, and the "Send to self" button 411 are rearranged to be placed in the top. In the case where the menu function unit 207 (change cancellation means) performed this rearrangement process, it additionally displays a "Reset to original order" button 801. When the "Reset to original order" button 801 is depressed by the user, the original detecting unit 201 detects an original, and the app selection screen 400 that is in the state before the original detecting unit 201 detected the original and the app buttons were rearranged is displayed. Specifically, the display order of the app buttons is reset to the default display order, and a page that had been displayed before the original was detected is displayed.

For example, in a case where the original detecting unit 201 detects an original being placed on in a state where the screen in FIG. 4C is being displayed, the menu function unit 207 displays the screen in FIG. 8A, and after that, when the "Reset to original order" button 801 is depressed, the screen in FIG. 4C is displayed again.

Likewise, in a case where the print job detecting unit 204 detects an unprinted job, the display order of the app buttons on the app selection screen 400 changes from the default display order.

Figure 9A:
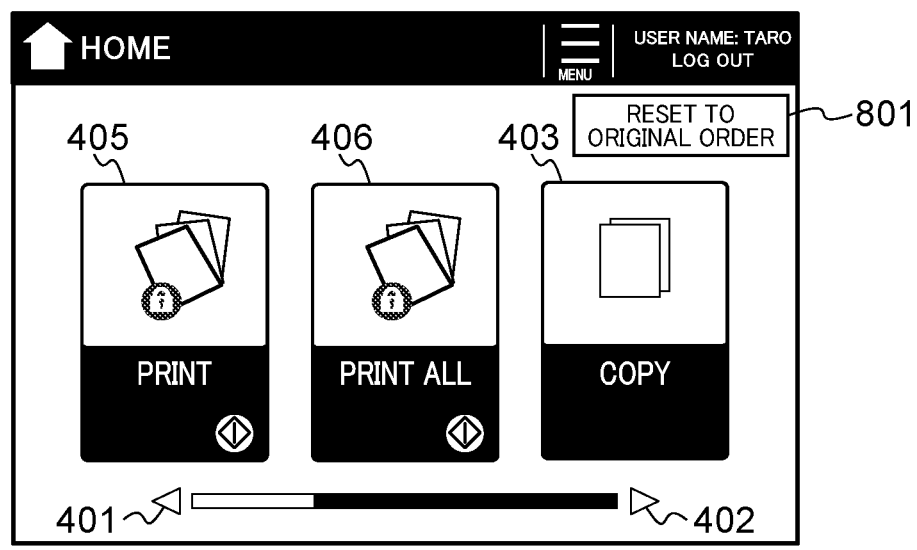
FIGS. 9A to 9C are views showing the app selection screen that is displayed when an unprinted job is detected.
Figure 9B:
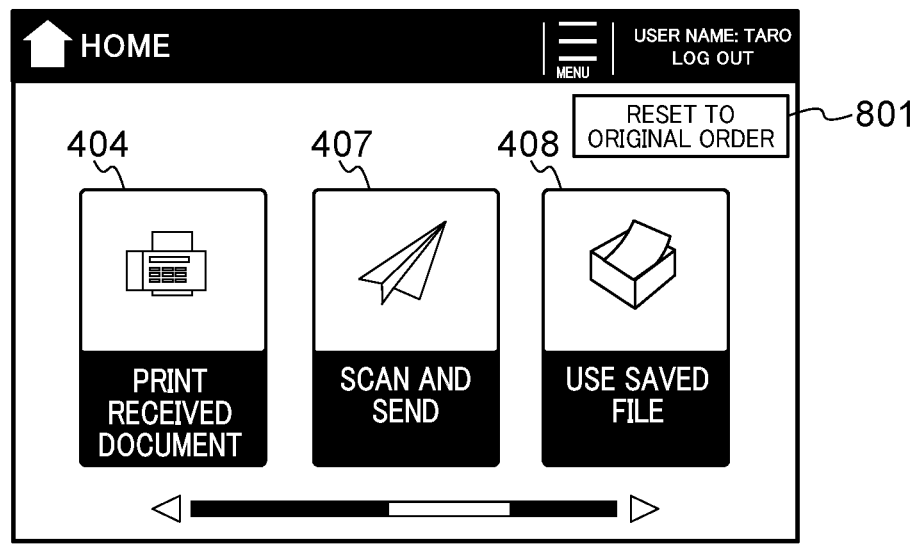
Figure 9C:
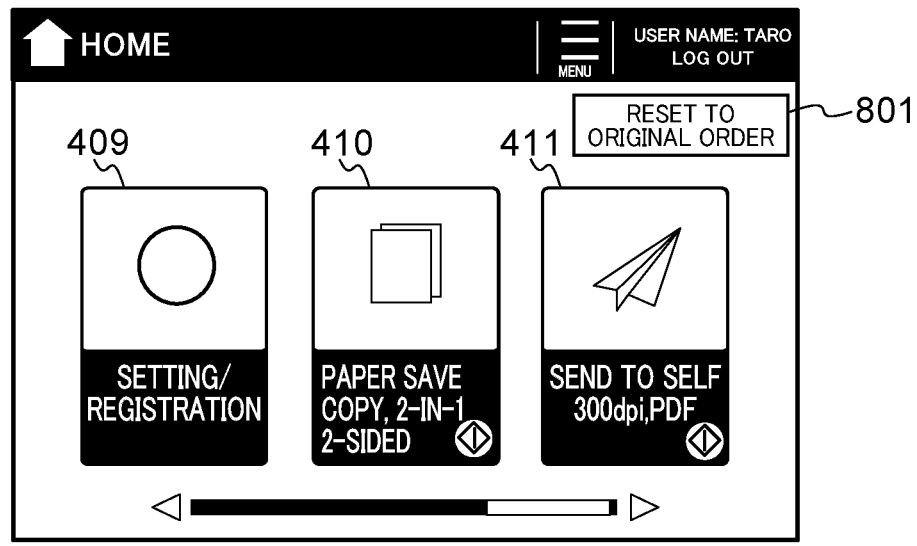

Referring to FIGS. 9A to 9C, the app buttons for which the button prioritizing event indicated in the data column 304 of the app button information table 209 is "Detect unprinted job" are rearranged to be placed in the top. Specifically, the "Print" button 405 and the "Print all" button 406 are rearranged to be placed in the top. In FIGS. 9A to 9C, in the case where the menu function unit 207 performed this rearrangement process, it additionally displays the "Reset to original order" button 801. When the reset to original order button 801 has been depressed by the user, similarly to the structure described at the description for FIGS. 8A to 8C, the app selection screen 400 that is in the state before the print job detecting unit 204 detected the unprinted job is displayed. Specifically, the display order of the app buttons is reset to the default display order, and a page that had been displayed before the original was detected is displayed.

Figure 10:
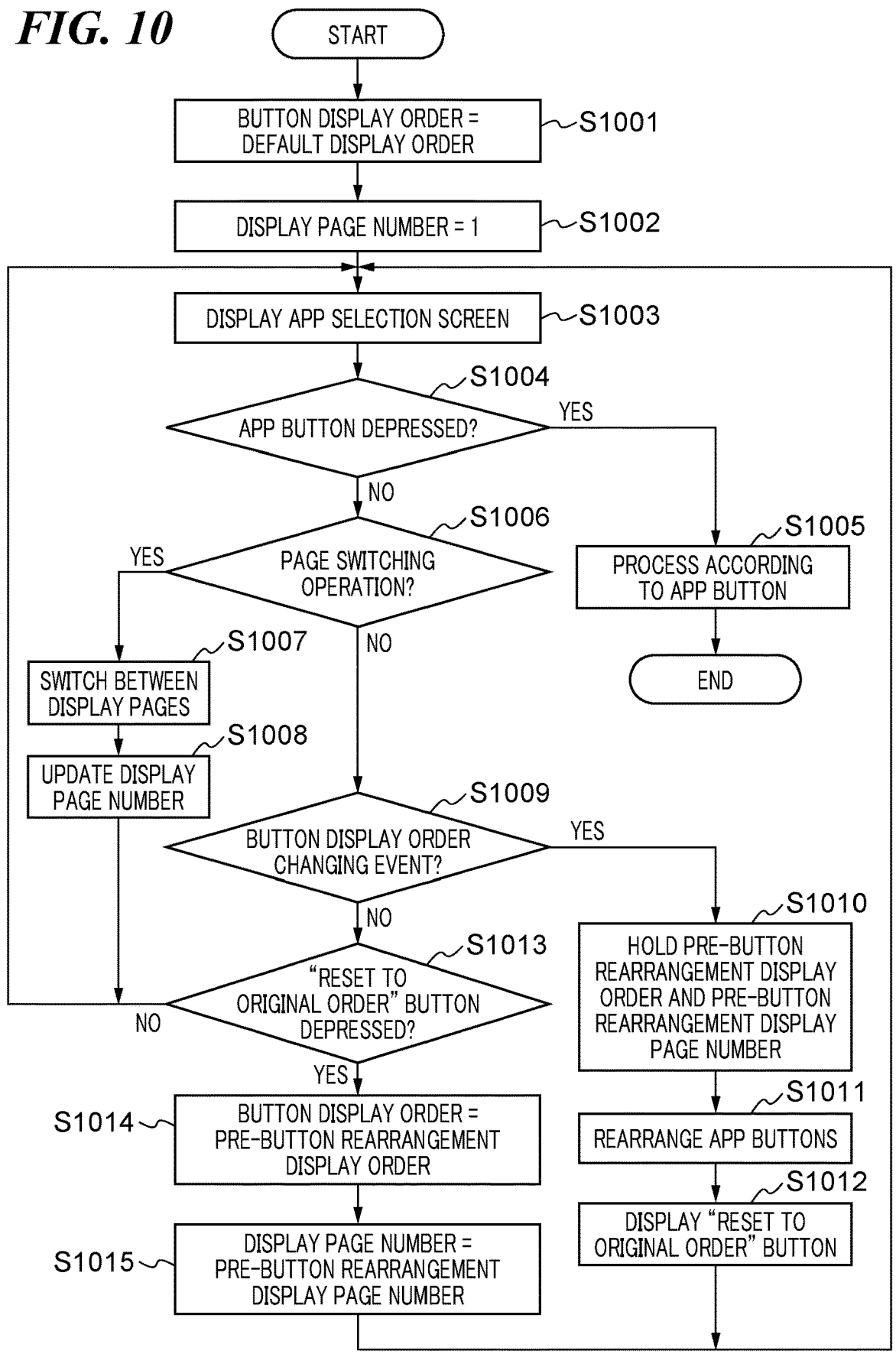
FIG. 10 is a flowchart of a rearrangement process for app buttons displayed on the app selection screen.

FIG. 10 is a flowchart of a rearrangement process for the app buttons displayed on the app selection screen 400. Steps in FIG. 10 are executed by the CPU 1001 of the image processing apparatus 100 reading out a program from the ROM 1002.

In step S1001, the CPU 1001 sets the display order of the app buttons to the default display order. Specifically, the button display order control unit 208 refers to the information in the app button information table 209 and notifies the menu function unit 207 of the information about the default display order in the data column 303 as a button display order.

Next, in step S1002, the CPU 1001 sets the display page number to "1". Specifically, the menu function unit 207 holds "1" in the RAM 1003 as the display page number.

Then, in step S1003, the CPU 1001 displays the app selection screen 400. Specifically, the menu function unit 207 displays the app buttons on the app selection screen 400 in the button display order notified of by the button display order control unit 208. As a result of the processes in the steps S1001 and S1002, the app buttons are arranged in the default display order on a screen that is displayed first, and its display page number is 1. Thus, the screen in FIG. 4A is displayed as the app selection screen 400.

After that, in step S1004, the CPU 1001 determines whether or not an app button has been depressed by the user. When the CPU 1001 determines that an app button has been depressed, the process proceeds to step S1005, and when the CPU 1001 determines that no app button has been depressed, the process proceeds to step S1006.

In the step S1005, the CPU 1001 carries out a process according to the depressed app button. Specifically, the menu function unit 207 determines which app button has been depressed, and executes an app according to the depressed app button or switches to a screen for executing this app. For example, when the depressed app button is the "Copy" button 403, the menu function unit 207 switches the display to the copying app screen.

In the step S1006, the CPU 1001 determines whether or not the page switching operation has been performed. Specifically, the menu function unit 207 receives an operating signal from the operating unit 1010 and determines a user operation. When the determined user operation is a depression of the page switching button 401 or 402 or a flick operation on the app selection screen 400, the user operation is determined that the page switching operation. When the CPU 1001 determines that the page switching operation has been performed, the process proceeds to step S1007, and when the CPU 1001 determines that the page switching operation has not been performed, the process proceeds to step S1009.

In the step S1007, the CPU 1001 switches between the display pages. Specifically, the menu function unit 207 moves the display page to the right or left according to the page switching operation determined in the step S1006.

In step S1008, the CPU 1001 updates the display page number. Specifically, the menu function unit 207 holds the present display page number in the RAM 1003. For example, when the screen has switched to the screen in FIG. 4A, the menu function unit 207 holds "1" as the display page number in the RAM 1003. Likewise, when the screen has switched to the screen in FIG. 4B, the menu function unit 207 holds "2" as the display page number in the RAM 1003, and when the screen has switched to the screen in FIG. 4C, the menu function unit 207 holds "3" as the display page number in the RAM 1003. After that, the CPU 1001 returns the process to the step S1003.

In the step S1009, the CPU 1001 determines whether or not a button display order changing event has occurred. When the button display order changing event has occurred, the button display order control unit 208 changes the button display order according to the button display order change event and notifies the menu function unit 207 of the changed button display order, followed by the process proceeding to step S1010. On the other hand, when the button display order changing event has not occurred, the process proceeds to step S1013.

Examples of the button display order changing event include detection of an original and detection of an unprinted job.

Upon detecting placement of an original on the scanner 1012, the original detecting unit 210 provides an original detection notification to the button display order control unit 208. Upon receiving the original detection notification, the button display order control unit 208 refers to the app button information table 209, and notifies the menu function unit 207 of the changed button display order in which the app buttons for which the button prioritizing event is "Detect original" are displayed in the top.

Upon detecting presence of an unprinted job, the print job detecting unit 204 provides an unprinted job notification to the button display order control unit 208. Upon receiving the unprinted job notification, the button display order control unit 208 refers to the app button information table 209, and notifies the menu function unit 207 of the changed button display order in which the app buttons for which the button prioritizing event is "Detect unprinted job" are displayed in the top.

It should be noted that when two or more button prioritizing events have occurred, for example, when the button display order control unit 208 has received both the original detection notification and the unprinted job notification, the button display order control unit 208 changes the button display order with a higher priority being given to the latter. Namely, the button display order control unit 208 changes the button display order based on the notification received at a later time. It should be that in such a case, it may be determined in advance which notification will be used as a basis for the button display order control unit 208 to change the button display order, or both of them may be used as a basis for the button display order control unit 208 to change the button display order.

In the step S1010, the CPU 1001 holds the button display order and the display page number before button rearrangement. Specifically, the menu function unit 207 holds the present button display order and display page number as a pre-button rearrangement display order and a pre-button rearrangement display page number, respectively, in the RAM 1003.

In step S1011, the CPU 1001 rearranges the app buttons displayed on the app selection screen 400. Specifically, the menu function unit 207 rearranges the app buttons displayed on the app selection screen 400 according to the button display order notified of by the button display order control unit 208. On this occasion, the CPU 1001 sets the display page number to "1". Specifically, the menu function unit 207 holds "1" as the display page number in the RAM 1003.

Then, in step S1012, the CPU 1001 displays the "Reset to original order" button 801 on the app selection screen 400. Specifically, the menu function unit 207 instructs the operating unit 1010 to display the "Reset to original order" button 801. The CPU 1001 then returns the process to the step S1003.

In step S1013, the CPU 1001 determines whether or not the "Reset to original order" button 801 has been depressed. Specifically, the menu function unit 207 receives operational information from the operating unit 1010 via the operating unit I/F 1005 and determines whether or not the "Reset to original order" button 801 has been touched on the app selection screen 400 displayed on the operating unit 1010. When it is determined that the "Reset to original order" button 801 has not been depressed, the process returns to the step S1003. When it is determined that the "Reset to original order" button 801 has been depressed, the process proceeds to step S1014.

In the step S1014, the CPU 1001 resets the button display order to the pre-button rearrangement display order. Specifically, the button display order control unit 208 reads out the pre-button rearrangement display order that was held in the RAM 1003 in the step S1010, and notifies the menu function unit 207 of the pre-button rearrangement display order as the button display order.

Then, in step S1015, the CPU 1001 switches the display page to a page that has the pre-button rearrangement display page number. Specifically, the menu function unit 207 reads out the pre-button rearrangement display page number that was held in the RAM 1003 in the step S1010. The CPU 1001 then returns the process to the step S1003. As a result, in the step S1003, the screen with the pre-button rearrangement display page number of the app selection screen 400 on which the app buttons have been rearranged in the pre-button rearrangement display order is displayed.

According to the process described above, when the button display order changing event has occurred, the order in which the app buttons are displayed on the app selection screen 400 is changed. For example, when detection of an original which is the button display order changing event has occurred, the button rearrangement is performed so that the app buttons corresponding to the apps that carry out a process to read the original are given higher priority to be displayed than the others, and the first-page of the app selection screen 400 in FIG. 8A is displayed. When detection of an unprinted job which is the button display order changing event has occurred, the button rearrangement is performed so that the app buttons corresponding to the apps that carry out a process to print the unprinted job are given higher priority than the others, and the first-page of the app selection screen 400 in FIG. 9A is displayed. As a result, it is highly possible that the user can easily select a desired app button.

However, there is a possibility that the app selection screen 400 displayed after the button display order changing event occurs is a screen that is not intended by the user. Thus, the menu function unit 207 displays the "Reset to original order" button 801 on the app selection screen 400 displayed after occurrence of the button display order changing event. This enables the user to immediately reset the display to the original display state by depressing the "Reset to original order" button 801. Thus, the user can select a desired app button without becoming confused. Moreover, in the present embodiment, to reset the button display order to the original one, the "Reset to original order" button 801, which is a soft key, is displayed on the display page of the app selection screen 400, and when a depression of the "Reset to original order" button 801 is detected, the button display order is reset to the default display order. The method for resetting the display order to the default one is not limited to this. For example, when a depression of one of hard keys (for example, a reset key) included in the operating unit 1010 is detected, the button display order may be reset to the default one.

OTHER EMBODIMENTS

Although in above description of the embodiments, the image processing apparatus 100 equipped with a plurality of functions such as the copy function and the scanner function is taken as an example, the present invention can be applied to image processing apparatuses equipped with only some of those functions. The present invention may also be applied to other information processing apparatuses such as personal computers, PDAs, mobile phones, faxes, cameras, video cameras, and other image viewers.

Moreover, although in the embodiments described above, the button prioritizing events are held in the app button information table 209, and when any button prioritizing event has occurred in the image processing apparatus 100, the app buttons on the app selection screen 400 are rearranged, the method for rearranging the app buttons is not limited to this. For example, a button display order for use in a case where a button prioritizing event has occurred is held in advance in the app button information table 209, and when the button prioritizing event has occurred, the app buttons are rearranged in this button display order.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-085058, filed May 14, 2020, and Japanese Patent Application No. 2020-085307, filed May 14, 2020, which are hereby incorporated by reference herein in their entirety.

What is claimed is:

1. An apparatus with a plurality of functions, comprising:
a memory storing instructions; and
at least one processor executing the instructions causing the apparatus to:
  display function buttons for executing the respective functions on a plurality of pages of a function selection screen, and switch between the pages of the function selection screen based on a page switching operation by a user;
  determine whether to automatically change a display order of the function buttons based on a state of the apparatus; and
  control so as to change the display order of the function buttons based on the state of the apparatus in a case where the page switching operation by the user to switch between the pages of the function selection screen to be displayed has not been received, and so as not to change the display order of the function buttons based on the state of the apparatus in a case where the page switching operation by the user to switch between the pages of the function selection screen has been received.

2. The apparatus according to claim 1, further comprising a scanner,
wherein the at least one processor further executes the instructions causing the apparatus to, in a case where an original is placed on the scanner change the display order so that function buttons for executing a process of scanning the original are displayed with higher priority than other function buttons.

3. The image forming apparatus according to claim 1, further comprising a printer,
wherein the at least one processor further executes the instructions causing the apparatus to, in a case where the apparatus has an unexecuted print job, change the display order so that function buttons for executing a process of printing the print job are displayed with higher priority than other function buttons.

4. The apparatus according to claim 1, wherein in a case where the display order is changed, a button for returning the display order of the function buttons to an original display order is displayed.

5. The apparatus according to claim 1, wherein the at least one processor further executes the instructions causing the apparatus to control so as not to change the display order of the function buttons based on a switching completion flag indicating that the page switching operation for the function selection screen has been received from the user.

6. The apparatus according to claim 1, wherein the at least one processor further executes the instructions causing the apparatus to control so as to change the display order of the function buttons based on a switching completion flag indicating that the page switching operation for the function selection screen has not been received from the user.

7. The apparatus according to claim 1, wherein the page switching operation includes one of at least a flick operation or a depression of a page switching button, on the function selection screen.

8. The apparatus according to claim 1, wherein the at least one processor further executes the instructions causing the apparatus to automatically change the display order of the function buttons based on the state of the apparatus, without receiving any user operation on the function selection screen.

9. The apparatus according to claim 1, wherein the function buttons include one or more of a print button for executing a printing function, a scan button for executing a scanning function, or a send button for executing a sending function.

10. The apparatus according to claim 1, wherein the at least one processor further executes the instructions causing the apparatus to control so as to change the display order of the function buttons under a condition where the page switching operation for the function selection screen has not been received from the user and the state of the apparatus is changed to a predetermined state.

11. The apparatus according to claim 1, wherein the at least one processor further executes the instructions causing the apparatus to control so as to change the display order of the function buttons based on the state of the apparatus in a case where a first page of the function selection screen is displayed, and so as not to change the display order of the function buttons based on the state of the apparatus in a case where a second or subsequent page of the function selection screen is displayed.

12. The apparatus according to claim 1, wherein the at least one processor further executes the instructions causing the apparatus to, when the state of the apparatus is changed to a predetermined state, control whether to change the display order of the function buttons based on whether the page switching operation for the function selection screen was received from the user before the change of the state of the apparatus to the predetermined state.

13. A control method for an apparatus with a plurality of functions, the control method comprising:
   displaying function buttons for executing the respective functions on a plurality of pages of a function selection screen, and switching between the pages of the function selection screen based on a page switching operation by a user;
   determining whether to automatically change a display order of the function buttons based on a state of the apparatus; and
   controlling so as to change the display order of the function buttons based on the state of the apparatus in a case where the page switching operation by the user to switch between the pages of function selection screen to be displayed has not been received, and so as not to change the display order of the function buttons based on the state of the apparatus in a case where the page switching operation by the user to switch between the pages of the function selection screen has been received.

14. The control method according to claim 13, wherein the control method further comprises controlling so as not to change the display order of the function buttons based on a switching completion flag indicating that the page switching operation for the function selection screen has been received from the user.

15. The control method according to claim 13, wherein the control method further comprises controlling so as to change the display order of the function buttons based on a switching completion flag indicating that the page switching operation for the function selection screen has not been received from the user.

16. The control method according to claim 13, wherein the page switching operation includes one of at least a flick operation or a depression of a page switching button, on the function selection screen.

17. The control method according to claim 13, wherein the control method further comprises automatically changing the display order of the function buttons based on the state of the apparatus, without receiving any user operation on the function selection screen.

18. The control method according to claim 13, wherein the control method further comprises controlling so as to change the display order of the function buttons under a condition where the page switching operation for the function selection screen has not been received from the user and the state of the apparatus is changed to a predetermined state.

19. The control method according to claim 13, wherein the control method further comprises controlling so as to change the display order of the function buttons based on the state of the apparatus in a case where a first page of the function selection screen is displayed, and so as not to change the display order of the function buttons based on the state of the apparatus in a case where a second or subsequent page of the function selection screen is displayed.

20. A non-transitory computer-readable storage medium storing a program for causing a computer to execute a control method for an apparatus with a plurality of functions, the control method comprising:
   displaying function buttons for executing the respective functions on a plurality of pages of a function selection screen, and switching between the pages of function selection screen based on a page switching operation by a user;
   determining whether to automatically change a display order of the function buttons based on a state of the apparatus; and
   controlling so as to change the display order of the function buttons based on the state of the apparatus in a case where the page switching operation by the user to switch between the pages of the function selection screen to be displayed has not been received, and so as not to change the display order of the function buttons based on the state of the apparatus in a case where the page switching operation by the user to switch between the pages of function selection screen has been received.

* * * * *